(12) United States Patent
Taylor

(10) Patent No.: US 12,716,311 B1
(45) Date of Patent: Aug. 25, 2026

(54) GAS SEAL TESTING SYSTEM

(71) Applicant: Gary Gene Taylor, Kingwood, TX (US)

(72) Inventor: Gary Gene Taylor, Kingwood, TX (US)

( * ) Notice: Subject to any disclaimer, the term of this patent is extended or adjusted under 35 U.S.C. 154(b) by 0 days.

(21) Appl. No.: 19/230,320

(22) Filed: Jun. 6, 2025

Related U.S. Application Data

(60) Provisional application No. 63/631,280, filed on Apr. 8, 2024.

(51) Int. Cl.
*E21B 33/03* (2006.01)
*G01M 3/28* (2006.01)

(52) U.S. Cl.
CPC ........... *E21B 33/03* (2013.01); *G01M 3/2869* (2013.01)

(58) Field of Classification Search
CPC .... E21B 33/03; G01M 3/2869; F16J 15/3296; F16J 15/3492
See application file for complete search history.

(56) References Cited

U.S. PATENT DOCUMENTS 2,491,599 A * 12/1949 Allen .................... F16L 23/165 285/123.3
3,880,433 A * 4/1975 Nau ...................... F04B 53/164 277/318

* cited by examiner

*Primary Examiner* — Gilbert Y Lee
(74) *Attorney, Agent, or Firm* — Plager Schack LLP; Mark H. Plager; Naomi Mann

(57) ABSTRACT

A gas seal testing method for ensuring proper sealing function of wellhead sealing component such as a tubing hanger, a casing hanger, or a wellhead test plug may comprise detecting gas pressure in a gas seal testing port in the wellhead sealing component, the wellhead sealing component being inserted inside a wellhead and including at least one outer seal member extending around a side surface of the wellhead sealing component and purposed for forming a seal between the wellhead sealing component and the wellhead.

13 Claims, 3 Drawing Sheets

10
14
12
16
12
18

GAS SEAL TESTING SYSTEM

RELATED APPLICATION

This application claims benefit to U.S. Application No. 63/631,280 filed Apr. 8, 2024, which is incorporated by reference herein in its entirety.

BACKGROUND

The present disclosure relates to systems and method for testing wellhead hangers and test plugs.

Wellhead hangers (i.e., tubing and casing hangers) and test plugs may be used in oil and gas well operations and may be essential for maintaining the well's structural integrity, preventing fluid leakage, and enabling proper operation. As such, a reliable system for testing seal in these components is needed.

SUMMARY

According to various embodiments, disclosed is a gas seal testing method for ensuring proper sealing function of wellhead sealing component such as a tubing hanger, a casing hanger, or a wellhead test plug. In some embodiments, the method may comprise detecting gas pressure in a gas seal testing port in the wellhead sealing component, the wellhead sealing component being inserted inside a wellhead and including at least one outer seal member extending around a side surface of the wellhead sealing component and purposed for forming a seal between the wellhead sealing component and the wellhead. In certain embodiments, detecting gas pressure may comprise introducing gas through the top opening, restricting gas flow through the top opening (e.g., via a check valve), and measuring resulting gas pressure via a pressure gauge inserted in the top opening to determine proper or improper sealing function, wherein a lower than expected pressure reading is indicative of improper sealing.

In certain embodiments, the gas seal testing port extends between a top surface of the wellhead sealing component and the side surface of the wellhead sealing component to provide a top opening and a side opening in the wellhead sealing component with a continuous passage therebetween. In certain embodiments, the side opening in the gas seal testing port is located above the at least one outer seal member. In further embodiments, the wellhead sealing component includes two outer seal members and the side opening in the gas seal testing port is located between the two outer seal members. In some embodiments, the gas seal testing port includes a vertical inlet channel which extends vertically downwards from the top surface and a horizontal outlet channel which extends perpendicularly from a lower portion of inlet channel to the side surface of the wellhead sealing component. In some embodiments, the inlet channel is configured to receive a pressure gauge hose.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figures 1, 2:
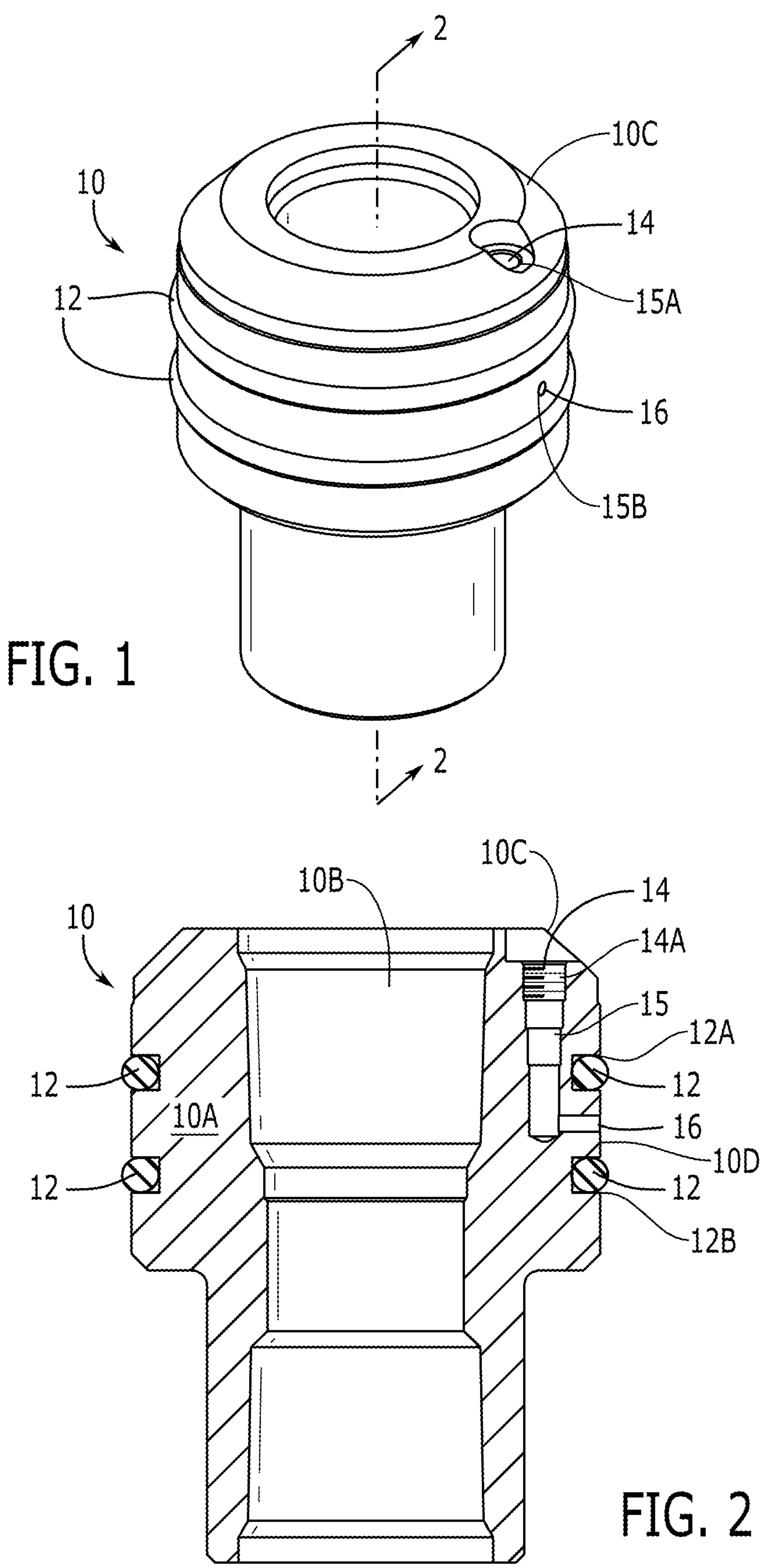
FIG. 1 is a top perspective view of an exemplary wellhead sealing component comprising a tubing hanger for a gas seal testing system, according to certain embodiments.
FIG. 2 is a cross-sectional view of the tubing hanger taken along line 2-2 of FIG. 1.
Figure 3:
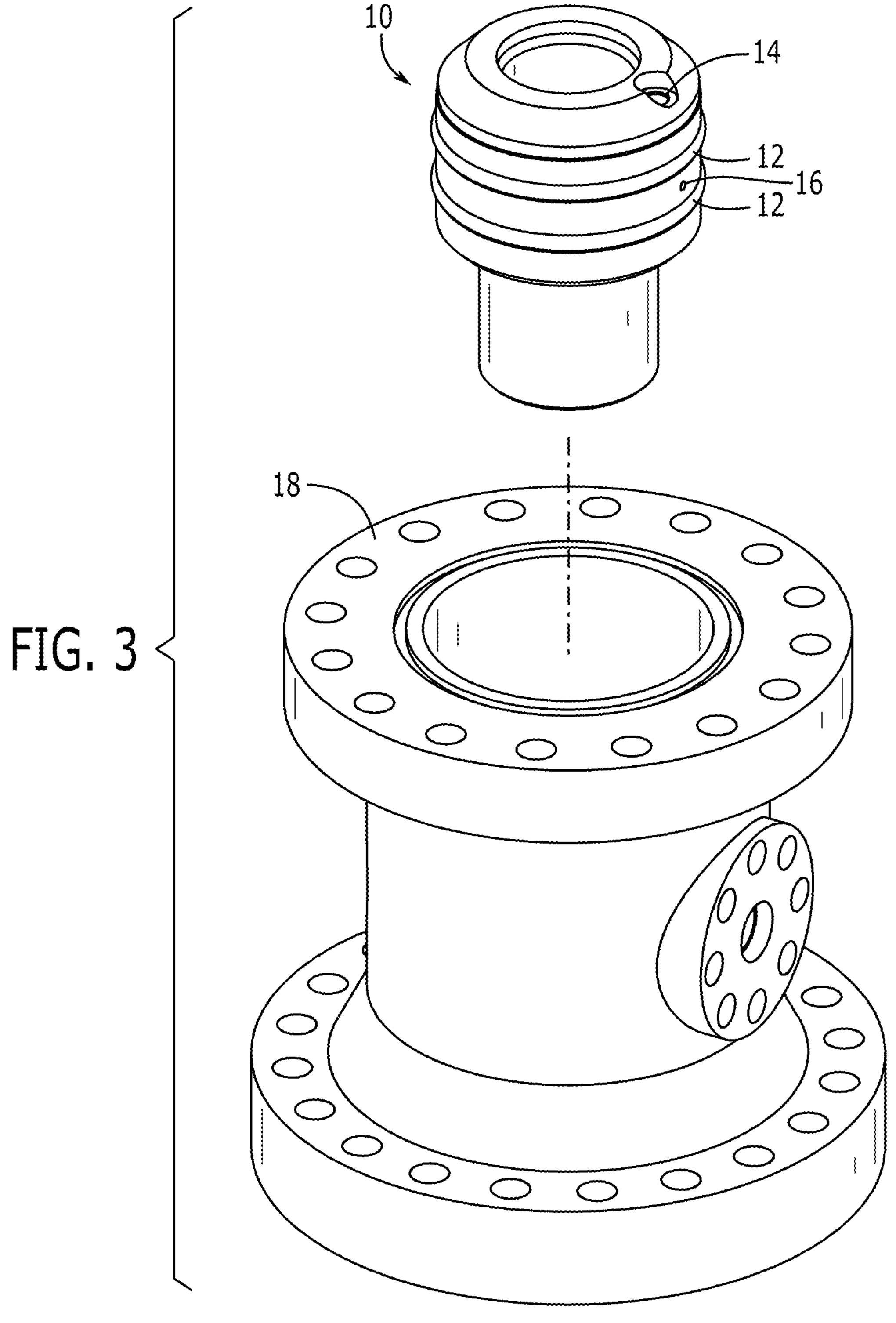
FIG. 3 depicts insertion of the hanger into a wellhead.
Figure 4:
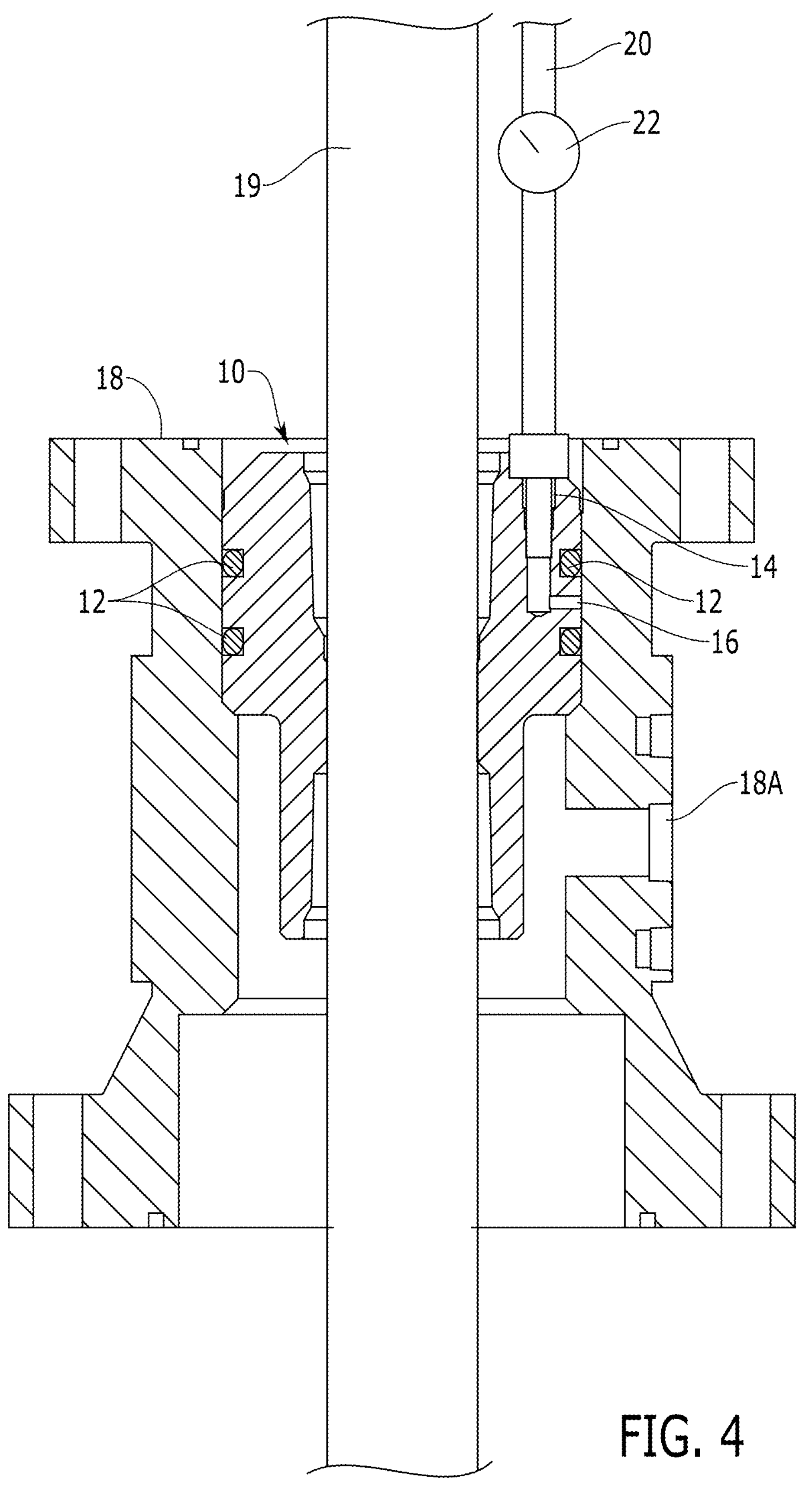
FIG. 4 is a cross-sectional view of the hanger inside the wellhead depicting gas seal testing of the hanger.

According to various embodiments as depicted in FIGS. 1-4, disclosed is a gas seal testing system for ensuring proper sealing in a wellhead sealing component 10. In embodiments, wellhead sealing component 10 may be a tubing hanger. In another embodiment, wellhead sealing component 10 may be a casing hanger. In another embodiment, wellhead sealing component may be a wellhead test plug, or similar component used in oil and gas well operations. As is known, such component may typically include a component body 10A providing at least one outer seal members or O-ring seal(s) 12 (comprising an O-ring recess in main body 10A and an O-ring received therein, as depicted). O-ring seal 12 is configured to seal a wellhead 18 when component 10 is inserted therein. In one embodiment as depicted in the figures, wellhead sealing component 10 includes a central hollow 10B for receiving a pipe 19, and upper and lower O-ring seals 12A, 12B configured to seal against a seal preparation in the upper portion of wellhead 18.

In certain embodiments, component 10 may be provided with at least one gas seal testing port 15, which may be created within component body 10A, for achieving gas seal testing. In some embodiments, the gas seal testing port 15 may extend between a top surface 10C and a side surface 10D in main body 10A, providing a top opening 15A and a side opening 15B in component body 10A, with continuous passage therebetween, wherein side opening 15B may be located above at least one outer O-ring seal 12 in the component body, or between upper and lower O-ring seals 12A, 12B. Thereby, a pressure gauge 22 may be installed in port 15 through top opening 15A to determine pressure flow 24 or proper/improper sealing by introducing a gas (e.g., nitrogen) through opening 15A (using a manifold in pressure gauge hose 20) with the top bowl in wellhead 18 being sealed by a check valve (not shown). Thereby, detection of pressure lower than the expected is indicative of improper sealing function. As such, by injecting gas test pressure the system may be monitored for determining seal integrity.

In certain embodiments as depicted in the figures, gas pressure testing port 15 may include a vertical inlet channel 14 which extends vertically downwards from top surface 10C and an outlet channel 16 which extends perpendicularly from a lower portion of inlet channel 14. In some embodiments, inlet channel 14 may include internal threading 14A for coupling to fittings in pressure gauge hose 20. It shall be appreciated that inlet channel 14 may be differently structured in alternate embodiments to accommodate installation of different types of fittings and/or other components.

The disclosed system may be implemented by machining or otherwise creating gas pressure testing port 15 in an existing steel tubing or casing hanger body or wellhead test plug, or by including testing port 15 in newly fabricated components. Gas pressure testing port 15 enables well sealing component 10 to be tested for proper sealing on site, i.e., once installed into the wellhead, or off site/prior to well installation. The ability to achieve a gas test assures seal integrity before work is started and saves time and money for costly rerunning of the component.

Thus, the disclosed gas seal testing system enables gas testing of well sealing components before after installation. In one example, a tubing hanger including testing port 15 may be installed on a pipe and lowered with the pipe into the wellhead with gas test fitting and/or hose attached. After it is secured in the wellhead, gas test pressure is injected and monitored to insure that a positive seal has been affected, or to detect issues with the seal that need to be addressed.

It shall be appreciated that components of the disclosed system may have different configurations in alternate embodiments, and that the system may apply to different types of wellhead sealing components that have different structural and functional features. It shall further be appreciated that the components of the disclosed system may comprise any alternative known materials in the field and be of any size and/or dimensions. It shall be appreciated that the components of the disclosed system may be manufactured or implemented using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A gas seal testing method for ensuring proper sealing function of a wellhead sealing component, the method comprising:

providing a gas seal testing port in the wellhead sealing component;

detecting gas pressure in the gas seal testing port provided in the wellhead sealing component, the wellhead sealing component being inserted inside a wellhead and including at least one outer seal member extending around a side surface of the wellhead sealing component and purposed for forming a seal between the wellhead sealing component and the wellhead, wherein the gas seal testing port extends between a top surface of the wellhead sealing component and the side surface of the wellhead sealing component to provide a top opening and a side opening in the wellhead sealing component with a continuous passage therebetween, wherein the wellhead sealing component is comprises a tubing hanger, a casing hanger, or a wellhead test plug, wherein the wellhead sealing component is separate from and removably insertable into the wellhead, and wherein detecting gas pressure comprising introducing gas through the top opening, restricting gas flow through the side opening, and measuring resulting gas pressure via a pressure gauge inserted in the top opening to determine proper or improper sealing function.

2. The method of claim 1, wherein the side opening in the gas seal testing port is located above the at least one outer seal member.

3. The method of claim 2, wherein the wellhead sealing component includes two outer seal members and the side opening in the gas seal testing port is located between the two outer seal members.

4. The method of claim 1, wherein the gas seal testing port includes a vertical inlet channel which extends vertically downwards from the top surface and a horizontal outlet channel which extends perpendicularly from a lower portion of inlet channel to the side surface of the wellhead sealing component.

5. The method of claim 4, wherein the inlet channel is configured to receive a pressure gauge hose.

6. A wellhead sealing component, comprising:

a gas seal testing port in a main body of the wellhead sealing component, at least one outer seal member extending around a side surface of the main body and purposed for forming a seal between the wellhead sealing component and a wellhead into which the wellhead sealing component is inserted, wherein the gas seal testing port extends between a top surface of the main body and the side surface of the main body to provide a top opening and a side opening in the main body with a continuous passage therebetween, wherein the wellhead sealing component comprises a tubing hanger, a casing hanger, or a wellhead test plug, wherein the wellhead sealing component is separate from and removably insertable into the wellhead, wherein the gas seal testing port enables the wellhead sealing component to be tested for ensuring proper sealing function therein by introducing gas through the top opening, restricting gas flow through the side opening, and measuring resulting gas pressure via a pressure gauge inserted in the top opening to determine proper or improper sealing function.

7. The wellhead sealing component of claim 6, wherein the side opening in the gas seal testing port is located above the at least one outer seal member.

8. The wellhead sealing component of claim 7, wherein the wellhead sealing component includes two outer seal members and the side opening in the gas seal testing port is located between the two outer seal members.

9. The wellhead sealing component of claim 6, wherein the gas seal testing port includes a vertical inlet channel which extends vertically downwards from the top surface and a horizontal outlet channel which extends perpendicularly from a lower portion of inlet channel to the side surface of the main body.

10. The wellhead sealing component of claim 9, wherein the inlet channel is configured to receive a pressure gauge hose.

11. The wellhead sealing component of claim 6, wherein the wellhead sealing component is a tubing hanger.

12. The wellhead sealing component of claim 6, wherein the wellhead sealing component is a casing hanger.

13. The wellhead sealing component of claim 6, wherein the wellhead sealing component is a wellhead test plug.

* * * * *